July 15, 1969  G. E. PIHL  3,456,123
PROGRAMMABLE DIGITAL TIME SWITCHING SYSTEM
Filed March 8, 1965  3 Sheets-Sheet 1

INVENTOR.
GEORGE E. PIHL
BY
*Nicholas A. Pandiscio*
ATTORNEY

July 15, 1969    G. E. PIHL    3,456,123
PROGRAMMABLE DIGITAL TIME SWITCHING SYSTEM
Filed March 8, 1965    3 Sheets-Sheet 2

INVENTOR.
GEORGE E. PIHL
BY
*Nicholas A. Pandiscio*
ATTORNEY

INVENTOR.
GEORGE E. PIHL

BY

*Nicholas A. Pandiscio*

ATTORNEY

United States Patent Office 3,456,123
Patented July 15, 1969

3,456,123
PROGRAMMABLE DIGITAL TIME SWITCHING SYSTEM
George E. Pihl, Abington, Mass., assignor to Miniature Electronic Components Corp., Holbrook, Mass., a corporation of Massachusetts
Filed Mar. 8, 1965, Ser. No. 437,773
Int. Cl. H03k 17/28
U.S. Cl. 307—141           15 Claims

ABSTRACT OF THE DISCLOSURE

A programmable time switching system in which a synchronous clock motor drives a series of rotors at different rates related to predetermined time increments, e.g., minutes, hours, etc. Associated with each rotor is a plurality of switches which are successively actuated as the rotor turns. Actuation of each switch operates to switch a voltage to a suitable coincidence gate which produces an output only when selected switches in each plurality are actuated simultaneously. Programmable means are provided for coupling selected switches to the input terminals of the coincidence gate and for applying the output signals of the coincidence gate to associated output circuit.

---

This invention relates to programmable switching systems and more particularly to an electro-mechanical switching system which can be programmed to operate one or more devices at selected times.

The primary object of the invention is to provide an inexpensive and reliable programmable switching system adapted to perform a number of switching functions at different pre-selected times, e.g., turning selected electrical devices on or off according to a predetermined schedule or program.

Another important object of the invention is to provide an electro-mechanical switching system which can be programmed in a digital manner and which also provides a digital indication of the time at which a switching operation is occurring.

These and other objects are attained by apparatus employing a slow speed synchronous motor which causes a series of rotors to rotate in predetermined angular increments related to selected time increments, e.g., minutes, hours, etc. Associated with each rotor is an array of switches and means for actuating the switches according to the rotor's angular position at any time. These switches are used to switch voltages to a suitable coincidence gate which produces an output signal when and only when all voltages have been switched. An output circuit board of novel construction facilitates programming the apparatus to cause output signals to occur at pre-selected digitally indicated times.

The invention and the objects and advantages thereof are believed to be more readily appreciated by reference to the following detailed specification which is to be considered together with the accompanying drawings wherein.

Figure 1:
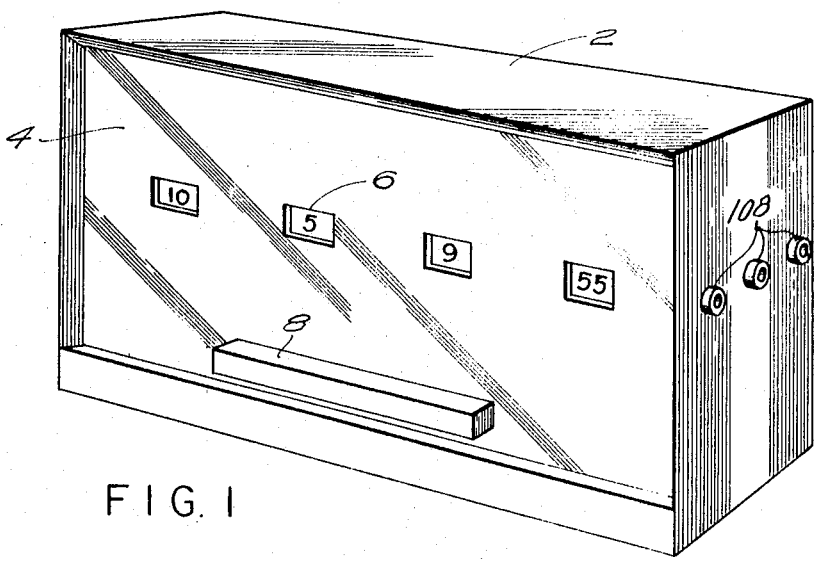
FIG. 1 is a perspective view of a preferred embodiment of the invention.
Figure 2:
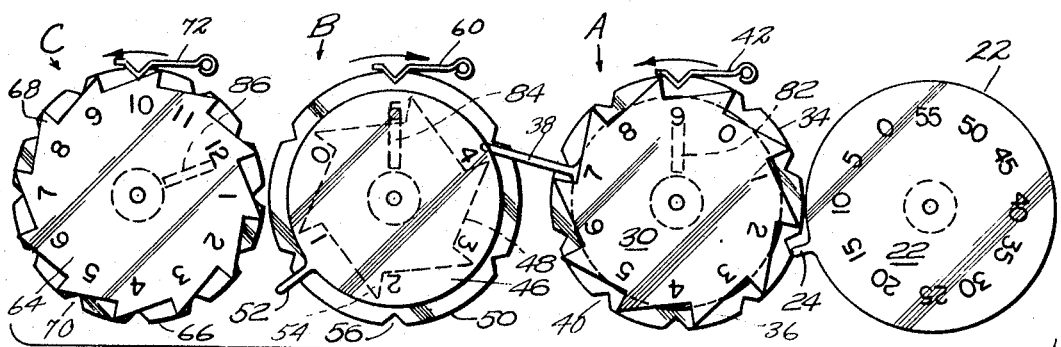
FIG. 2 is a view in elevation of the rotor system forming part of the apparatus at FIG. 1.
Figure 3:
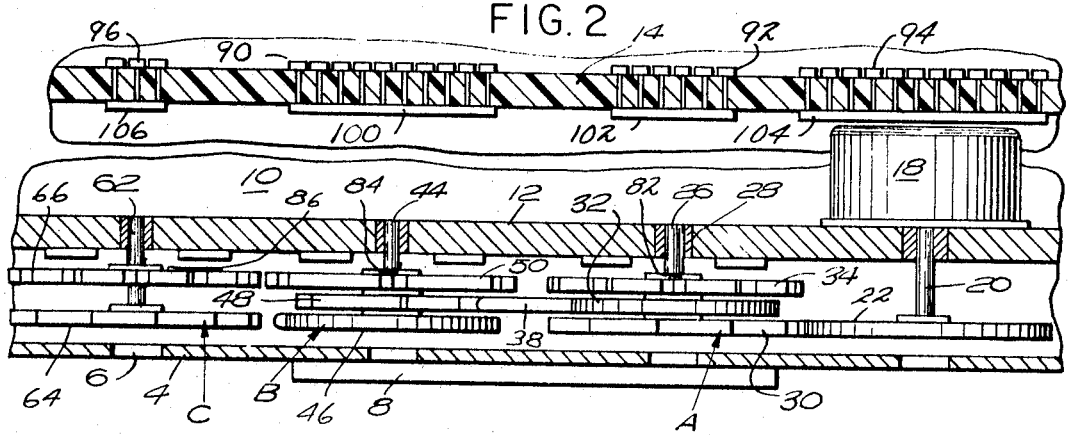
FIG. 3 is a plan sectional view of the rotor system and related structure.

Turning first to FIGS. 1-3, the illustrated embodiment comprises a rectangular housing 2 having a front panel 4 provided with four windows 6. Although not shown, it is to be understood that the front panel is hinged at the top and that it is held closed by suitable detent means (not shown). A handle 8 facilitates swinging the panel to open position for access to the system. Mounted within the housing on a suitable chassis 10 is a mounting panel 12 and a printed circuit board 14, both of which are disposed in parallel relation to the front panel of the case. The mounting panel supports a 1 r.p.m. synchronous clock motor 18 having an output shaft 20 on which is mounted an actuator 22 in the form of a circular disk having a radially projecting finger 24 which functions as a pawl. Also supported by the mounting panel is a rotor system comprising three rotor units identified generally as A, B, and C. For convenience of description and illustration, the rotor units are shown as assemblages of discrete elements mounted on a common shaft. However, it is to be appreciated that the rotors may be formed in a different manner and still perform their intended function. Thus, for example, each rotor may consist of a single plastic body with different axially spaced portions constructed to function the same as the individual elements shown in FIGS. 2 and 3.

More particularly rotor A consists of a shaft 26 journaled in a bearing 28 secured in the mounting panel. Affixed to and rotatable with the shaft are three separate members, namely, a ratchet wheel 30, an actuator 32, and a detent member 34. The ratchet wheel consists of ten ratchet teeth 36 spaced uniformly. The actuator is in the form of a circular disk having a radially extending finger 38 which functions as a pawl. The detent member is in the form of a circular disk having ten V shaped notches 40 in its periphery. From FIG. 2 it is to be noted that the detent member is disposed so that its notches 40 are angularly displaced from the radially extending edges of teeth 36. The ratchet wheel 30 is located in co-planar relation with actuator 22 so that pawl 24 of the latter will engage its teeth and thereby cause it to rotate. A spring detent clip 42 mounted on panel 12 coacts with notches 40 to cause rotor A to index 1/10 of a revolution for each revolution of actuator 22.

The second rotor B consists of a shaft 44 journaled in a bearing supported in the mounting panel. Mounted on the shaft are an actuator 46, a ratchet wheel 48, and a detent member 50. Actuator 46 is in the form of a circular disk having a radially extending finger 52 which functions as a pawl. Ratchet wheel 48 has six equally spaced teeth 54. Detent member 50 has six equally spaced V shaped notches 56 angularly displaced from the radially extending edges of successive teeth of the ratchet wheel. A spring detent clip 60 coacts with notches 56 to hold rotor B in one of six different index positions in the absence of a turning force applied by rotor A. In this connection it is to be noted that ratchet wheel 48 is in co-planar relation with actuator 32 of the first rotor assembly and that finger 38 of actuator 32 is long enough to engage the teeth of ratchet wheel 48 and thereby cause rotor B to index 1/6 of a revolution for each revolution of rotor A.

The third rotor C consists of a shaft 62 on which are mounted a ratchet wheel 64 and a detent member 66. The ratchet wheel has twelve equally spaced teeth 68 and the detent member has twelve equally spaced V shaped notches 70. The latter are located in line with points almost half way between the radially extending edges of successive teeth of ratchet wheel 64. This ratchet wheel is located in co-planar relation with actuator 46 of the rotor B so that its teeth can be engaged by finger 52. Rotor C is held against free movement by a detent clip 72 and is indexed by finger 52 ¹⁄₁₂ of a revolution for each revolution of rotor B.

From the foregoing description, it is believed to be apparent that the rotor system constitutes a digital clock where the angular position of rotor assembly C indicates the hour, the angular position or rotor assembly B indicates the integral ten-minute, and the angular position or rotor A indicates the minute. A visual digital indication of time is available through windows 6 by providing appropriate numerals on the foremost element of each rotor. Thus, ratchet wheel 30 has numbers running from 0–9 to indicate minutes, actuator 46 has numbers running from 0–5 to indicate ten-minute integrals, and ratchet wheel 64 has the numbers 1–12 to indicate hours. Additionally, actuator 22 has numbers running from 0–55 in increments of 5 to indicate time intervals in the order of seconds.

Figure 4:
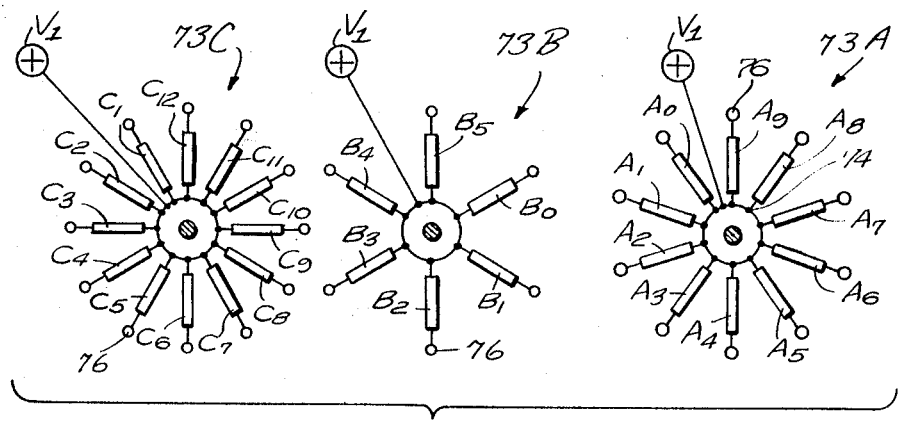
FIG. 4 is a view in elevation of the arrays of reed switches associated with the rotor system.

Mounted on the mounting panel behind each detent disk are arrays 73A, 73B and 73C of single pole, single throw magnetic reed switches (see FIGS. 3 and 4) mounted in concentric relation to the shafts on which the rotors are mounted. The array associated with rotor A consists of 10 reed switches $A_0, A_1, \ldots A_9$. The array associated with the rotor B consists of six equally spaced switches $B_0, B_1, \ldots B_5$. The array associated with rotor C assembly consists of 12 reed switches $C_1, C_2, \ldots C_{12}$. One terminal 74 of each of the switches $A_1, A_2$, etc. is connected to a common positive voltage source $V_1$. The corresponding terminals of switches $B_0, B_1$, etc. and switches $C_1, C_2$, etc. are connected to the same common positive voltage sources $V_1$. The opposite terminals 76 of the switches are connected to the printed circuit programming board described hereinafter. The switches in each array are normally open. They are actuated, i.e., closed, by three small elongated permanent magnets 82, 84, and 86 which are mounted on the rear face of the detent members of rotors A, B, and C respectively. The spacing between the detent members and the switches is relatively small so as to minimize the magnetic field strength required to actuate the switches. Angular spacing between the switches is sufficient to assure that no more than one switch is "on" at any one time in each array. At this point it is to be appreciated that each magnet is disposed so that it will close a different switch at each index position of the rotor with which it is associated.

More specifically the magnets are mounted so that the switches which are actuated at a given instant correspond in numbering to the digital time at that instant. Thus, at 10:59 magnet 86 closes switch $C_{10}$, magnet 84 closes switches $B_5$, and magnet 82 closes switch $A_9$, as seen by a comparison of FIGS. 2 and 4.

Actuation of the reed switches in the manner first described is utilized to cause some desired switching event to occur at a selected time, measured in hours and minutes, e.g. 10:59. To achieve this it is necessary to provide some means of sensing when the three switches corresponding to that time are simultaneously closed, preferably without interfering with the use of any of these switches for some other switching event. This is accomplished by means of a programmable output system featuring a plurality of programmable time selection circuits adapted to be selectively coupled to one or more output circuits. This programmable output system involves the programming board 14.

Turning now to FIGS. 3, 5, 6, and 7 the programming board is a double-sided copper-clad printed circuit board. Its rear side has four groups of vertical strips 90, 92, 94, and 96 while its front side has four banks of horizontal strips 100, 102, 104, and 106. The strips 90 are connected by suitable leads (not shown) to the output terminals of the reed switches $A_0 \ldots A_9$ associated with rotor A; strips 92 are connected in the same way to reed switches $B_1 \ldots B_5$; and strips 94 are connected to reed switches $C_1 \ldots C_{12}$. The vertical strips in each group are numbered in accordance with the time periods at which the switches to which they are connected are actuated. Thus the right-most strip 90 numbered 0 and the left-most strip 90 numbered 9 are connected to switches $A_0$ and $A_9$ respectively. The fourth group of strips 96 correspond in number and are connected to three output relay circuits (described hereinafter) embodied in the system. Three female output connectors 108 (FIG. 1) are provided for coupling the output relay circuits to the systems desired to be switched "on" or "off" at scheduled times.

The four banks of horizontal strips 100, 102, 104, and 106 are located directly in front of the four groups of vertical strips 90, 92, 94, and 96 respectively. The four banks have the same number of strips, one for each time selection circuit embodied in the apparatus. As explained more fully hereafter, each set of corresponding strips 100, 102, and 104 functions as input terminals for a single time selection circuit, while the corresponding strip 106 serves as the output terminal for the same time selection circuit.

The programming board also is provided with a multitude of holes 110 located at each intersection of a vertical strip and a horizontal strip. These holes are sized to accept self-tapping screws 112 which function to connect a selected vertical strip with a selected intersecting horizontal strip. Thus to program the system all that is necessary is to insert self-tapping screws into the appropriate holes. For example, suppose the following switching program is desired:

1—output circuit @ 11:41
2—output circuit @ 2:58
3—output circuit @ 1:59
1—output circuit @ 1:11
2—output circuit @ 10:40

Figure 6:
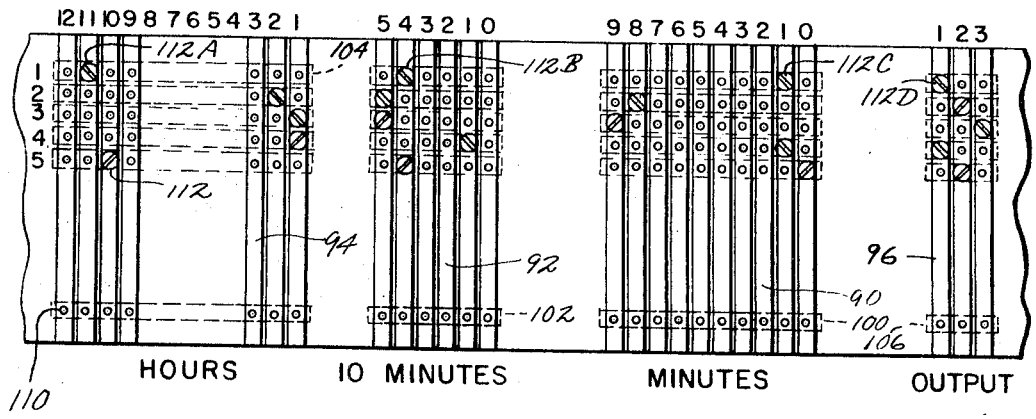
FIG. 6 is a fragmentary rear view in elevation of the programmable printed circuit board.

The program would be set up with the connections made as shown in FIG. 6, where screws 112A, 112B, and 112C determine the time 11:41 and screw 112D determines that the switching event occurs for output circuit No. 1. In similar fashion succeeding rows of screws contacting strips 90, 92, and 94 determine the switching times 2:58, 1:59, 1:11, and 10:40; while the other screws contacting strips 96 determine that at said times the switching is accomplished by output circuits Nos. 2, 3, 1, and 2 respectively.

Figure 5:
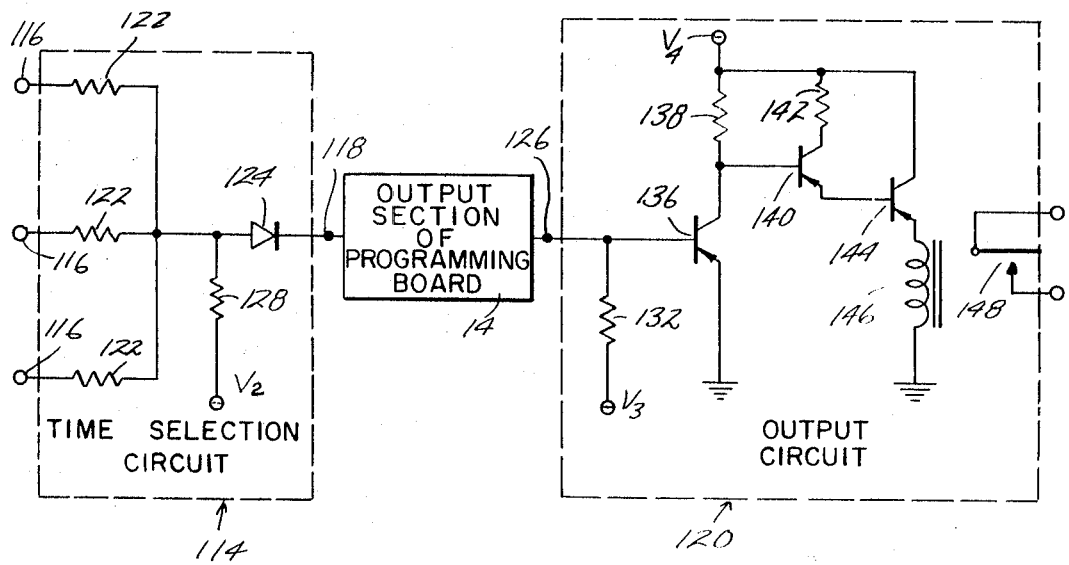
FIG. 5 is a schematic illustration of a portion of the programmable electrical system.
Figure 7:
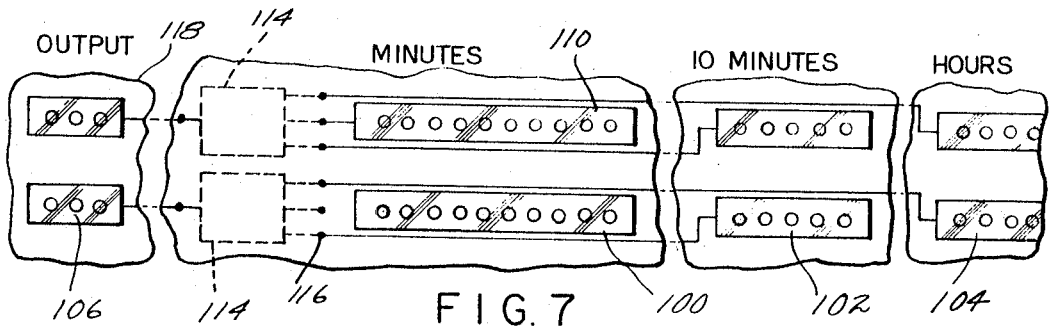
FIG. 7 is a fragmentary front view in elevation of the programmable printed circuit board.

Each time selection circuit takes the form of a coincidence gate and preferably is mounted on the programming board as represented at 114 in FIG. 7. Each time selection circuit has three input terminals 116 connected to a set of horizontal strips 100, 102, and 104 and an output terminal 118 connected to a corresponding horizontal strip 106 which is programmed by means of a screw 112D and a vertical strip 96 to couple the output of the circuit to a selected one of the three output relay circuits. FIG. 5 illustrates a preferred form of time selection circuit 114 coupled via the output section of the programming board to a selected output relay circuit 120. Although not shown it is to be understood that there are three such output circuits and that they are mounted on the chassis (where necessary because of the nature of the equipment being controlled, the output relay circuits may be mounted externally of the housing). The time selection circuit shown in FIG. 5 comprises three resistors 122 connected in parallel between the input terminals 116 and a diode 124. The latter is connected to output terminal 118 which in turn is connected by the output section, i.e. strip 96 and 106, of the programming board to the input terminal 126 of the output circuit. A fourth resistor 128 is connected between diode 124 and a negative voltage source $V_2$. The other side of diode 124 is connected to a negative voltage source $V_3$ via another resistor 132 forming part of output circuit 120. At this point it is to be noted that resistor 128 has a value such that when a positive voltage is applied (via closed reed switches) to one or two of the three inputs, diode 124 will be back biased and non-conducting, whereas in the presence of three input signals it will conduct.

With reference to output relay circuit 120, the junction of terminal 126 and resistor 132 is connected to the base of a transistor 136. The latter has its emitter connected to ground and its collector connected to a negative voltage source $V_4$ through a resistor 138. The collector of transistor 136 is also connected to the base of a second transistor 140. The collector of this second transistor is connected to voltage source $V_4$ by way of a resistor 142, while its emitter is connected to the base of a third transistor 144. The latter has its collector connected directly to voltage source $V_4$, while its emitter is connected to ground through the coil 146 of an output relay having a pair of normally open contacts 148. The latter are connected to one of the female output connectors 108. Resistor 132 is chosen to cause transistor 136 to be normally saturated (diode 124 not conducting) but to be driven to cutoff with diode 124 conducting. When transistor 136 is at cutoff, transistor 140 and hence transistor 144 are made conducting, thus causing the relay contacts 148 to close. Thus if a male plug is inserted in the connector 108 coupled to contacts 148, an output signal is available at a selected time to initiate or terminate operation of remote devices or systems, e.g., alarms, locks, lights, etc.

Figure 8:
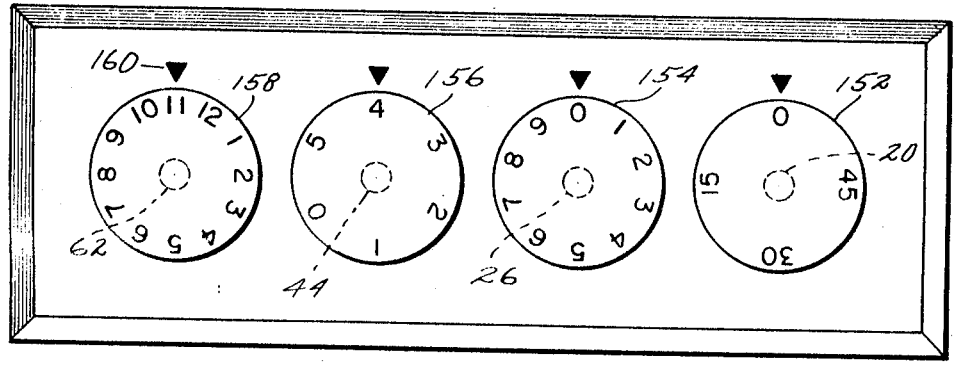
FIG. 8 is a view in elevation of the front panel of a second embodiment of the invention.

FIG. 8 shows a modification of the invention wherein the shafts 20, 26, 44, and 62 project through the front panel 4A of the cabinet and are fitted with like dials 152, 154, 156, and 158 which are provided with indicia corresponding to the indicia shown in FIG. 2 carried on actuator 20 and the foremost elements of the three rotors. Indicating means 160 on panel 4A indicate the digital values of the time integrals represented by the several dials, e.g. the time 11:40:00 as shown.

The advantages of the foregoing system are many. First and foremost is the fact that the illustrated apparatus is simple yet easy and cheap to manufacture and assemble. A second important advantage is that it is easily programmed. A third advantage is that it can accommodate a relatively large number of time selection circuits so that one unit can be used to perform a large number of switching tasks in a single 24-hour period. A fourth advantage is that the programming board serves as the rear panel of the case and thus is conveniently located for programming purposes. A fifth advantage is that it has a dual function as a time-controlled switching system and time indicator. Another advantage is that the rotor system may be easily reset to the correct time in the event its operation has ceased or been interrupted as, for example, due to a power failure. Resetting is accomplished by rotating the various rotors until they occupy the correct position for the time at the instant of correction. A further advantage is that the system is capable of being designed so as to switch more thn the limited number of output circuits illustrated in the drawings. Still other advantages reside in the fact that more or less rotors can be used, both for shorter and/or longer time intervals. For example, a 12 r.p.m. motor could be used with an additional 12 tooth rotor and switch assembly for five-second intervals. Similarly the "hour" rotor could be followed by one representing longer time intervals, such as a rotor and switch assembly which would differentiate between a.m. and p.m. as well as each day of the week, thereby allowing the program to be varied day and night and day by day. It is to be noted also that the output circuits may be varied so as to turn devices on, off, on at one time and off at another, momentary as for signaling bells, and by using delay relays, to delay actuation so as to achieve sequential operation of a plurality of devices.

It is to be understood that the invention is not limited in its application to the details of construction and arrangement of parts specifically described or illustrated, and that within the scope of the appended claims, it may be practiced otherwise than as specifically described or illustrated.

I claim:

1. A programmable switching system including a plurality of rotors, a motor, means driven by said motor for indexing said rotors at different predetermined rates, an array of switches associated with each rotor, each switch having a pair of normally open contacts and a terminal for each contact, means operative with each rotor to actuate in turn successive switches of the array associated with said each rotor as it indexes at its predetermined rate, means connecting a voltage to one terminal of each switch, circuit means for producing an output switching signal in response to a like plurality of voltages applied simultaneously by actuated switches of different arrays, and programmable means for connecting the other terminal of selected ones of said switches to said circuit means, whereby said output switching signal is produced at a time determined by the switches selectively connected to said circuit means and the indexing rate of said rotors.

2. A programmable system for generating electrical signals at selected times including a synchronous clock motor, a plurality of rotors, means driven by said motor adapted to index said rotors at different predetermined rates in synchronism with said motor, an array of switches associated with each rotor, means operative with each rotor to actuate successive switches of the array associated with said each rotor as it indexes at its predetermined rate, and a programmable output circuit connected to said switches and adapted to provide an output signal when predetermined switches of said arrays are actuated simultaneously.

3. A programmable system as defined by claim 2 wherein said rotors are mounted on parallel shafts and said switches are arranged in circular arrays concentric with said shafts, and further wherein said switch actuating means are mounted on said rotors.

4. A programmable system for generating electrical switching signals at selected times, including a synchronous clock motor, a plurality of rotors, means adapted to index said rotor at different predetermined rates in synchronism with said motor, a like plurality of programmable means each adapted to produce a signal when a different one of said rotors has indexed to a preselected angular position, and means for generating an output switching signal in response to coincident signals produced by said plurality of programmable means.

5. A system as defined by claim 4 further including a like plurality of dials, means connecting each dial with a different one of said rotors so as to rotate therewith, each dial being provided with indicia representative of selected time integrals related to the indexing rate of the rotor to which said each dial is connected, and means cooperating with the indicia on said dials to indicate the time at a given instant.

6. A system as defined by claim 4 further including indicating means associated with each rotor adapted to indicate predetermined time increments with respect to the indexing rates of said rotors, each of said indicating means comprising a first member provided with indicia representatve of predetermined time integrals and a second member cooperating with said indicia to indicate individual ones of said time integrals, one of said first and second members being stationary and the other of said first and second members being connected to and movable with the rotor with which said each indicating means is associated.

7. A system as defined by claim 4 wherein said rotors are provided with indicia representative of selected time integrals related to the indexing rates thereof, and means cooperating with said indicia to indicate the time at a given instant.

8. A system as defined by claim 7 having three rotors, and further wherein said indexing means is adapted to (a) index one rotor once for each minute interval, (b) index another rotor once for each 10-minute interval, and (c) index the third rotor once for each hour interval.

9. A programmable electrical switching system comprising an electrical motor having an output shaft, three rotors each comprising a set of ratchet teeth, detent means for releasably holding each rotor against rotation, means on said output shaft adapted to mesh with the teeth of one of said rotors and index said one rotor one tooth position each time said output shaft rotates, means on said one rotor adapted to mesh with the teeth of a second rotor and index said second rotor one tooth position each time said one rotor rotates, means on said second rotor adapted to mesh with the teeth of the third rotor and index said third rotor one tooth position each time said second rotor rotates, an array of switches associated with each rotor, the number of switches of said each array equalling the number of index positions of said each rotor, means for operating successive switches of each array as the rotor associated with said each array moves through successive index positions, a source of voltage normally connected to one side of each switch, a printed circuit board having on one side three horizontal conductive strips and on the opposite side three correspondingly located groups of vertical conductive strips, the number of vertical strips in each group corresponding to the number of switches in a different one of said arrays, means connecting the other side of each switch to a different one of said vertical strips, an output circuit including a coincidence gate having separate input terminals connected to each horizontal strip, said output circuit operating to produce an output switching signal when input voltages are applied to all of said input terminals simultaneously via said three horizontal strips, and means for selectively connecting each horizontal strip to any strip of the corresponding group of vertical strips.

10. The system of claim 9 wherein said one rotor has 10 index positions and makes one complete revolution every 10 minutes, said second rotor has six index positions and makes one complete revolution each hour, and said third rotor has 12 index positions and makes one complete revolution each 12 hours.

11. The system of claim 10 further including means for indicating the time represented by the angular position of said rotors at a given instant.

12. A programmable switching system including a plurality of rotors, means for indexing said rotors at predetermined rates, an array of switches associated with each rotor, each switch having a pair of normally open contacts and a terminal for each contact, means operative with each rotor to actuate succesively switches of the array associated with said each rotor as it indexes at its predetermined rate, means connecting a voltage to one terminal of each switch, circuit means for producing an output switching signal in response to a like plurality of voltages applied by switches of different arrays, said circuit means including a coincidence gate adapted to produce an output only in response to coincident input voltages and an amplifier for producing said output switching signal in response to the output of said gate, and programmable means for conecting the other terminal of selected ones of said switches to said circuit means so that said output switching signal is produced at a time determined by the switches selectively connected to said circuit means and the indexing rate of said rotors.

13. A programmable system for generating electrical signals at selected times including a synchronous clock motor, a plurality of rotors adapted to index at predetermined rates in synchronism with said motor, said rotors mounted on parallel shafts, a plurality of magnetically actuatable switches associated with each rotor, each plurality of switches arranged in a circular array about the shaft on which said each rotor is mounted, means mounted on each rotor for actuating successive switches of the array associated with said each rotor as it indexes its predetermined rate, said actuating means comprising magnets, and a programmable output circuit connected to said switches and adapted to provide an output signal when predetermined switches of said arrays are actuated simultaneously.

14. A programmable system for generating electrical signals at selected times including a synchronous clock motor, a plurality of rotors adapted to index at predetermined rates in synchronism with said motor, an array of switches associated with each rotor, means operative with each rotor to actuate successive switches of the array associated with said each rotor as it indexes at its predetermined rate, means connecting voltages to one side of each switch, an output circuit including a coincidence gate having a separate input terminal for each array of switches and adapted to produce an output signal only when input voltages exist at all of said input terminals, and programmable means for connecting the other side of selected switches to said input terminals so that an output signal occurs when selected switches of said arrays are actuated simultaneously.

15. A programmable system for generating electrical switching signals at selected times, including a synchronous clock motor, a plurality of rotors, means for indexing one of said rotors once for each minute interval in synchronism with said motor, means attached to said one rotor for indexing another rotor once for each 10-minute interval, means attached to said another rotor for indexing the third rotor once for each hour interval, a like plurality of programmable means each adapted to produce a signal when a different one of said rotors has indexed to a preselected angular position, and means for generating an output switching signal in response to coincident signals produced by said plurality of programmable means.

References Cited

UNITED STATES PATENTS

| | | | |
|---|---|---|---|
| 2,825,020 | 2/1958 | Johnson et al. | 317—141 X |
| 3,027,506 | 3/1962 | Stenhammar | 307—141.8 X |
| 3,152,323 | 10/1964 | Pardee | 307—141.8 X |
| 3,200,303 | 8/1965 | Maxwell | 307—141 X |

ROBERT K. SCHAEFER, Primary Examiner

T. B. JOIKE, Assistant Examiner

U.S. Cl. X.R.

200—38; 340—309.4